US011323257B2

(12) United States Patent
Peitz et al.

(10) Patent No.: US 11,323,257 B2
(45) Date of Patent: May 3, 2022

(54) ENCRYPTION OF BEACONS

(71) Applicant: OSRAM GmbH, Munich (DE)

(72) Inventors: Christoph Peitz, Lippstadt (DE);
Andrej Wallwitz, Munich (DE);
Karl-Heinz Wallwitz, Berlin (DE)

(73) Assignee: OSRAM GmbH, Munich (DE)

( * ) Notice: Subject to any disclaimer, the term of this patent is extended or adjusted under 35 U.S.C. 154(b) by 109 days.

(21) Appl. No.: 16/610,109

(22) PCT Filed: Apr. 27, 2018

(86) PCT No.: PCT/EP2018/060836
§ 371 (c)(1),
(2) Date: Nov. 1, 2019

(87) PCT Pub. No.: WO2018/202569
PCT Pub. Date: Nov. 8, 2018

(65) Prior Publication Data
US 2020/0084619 A1 Mar. 12, 2020

(30) Foreign Application Priority Data
May 3, 2017 (DE) ...................... 10 2017 109 423.7

(51) Int. Cl.
*H04K 1/10* (2006.01)
*H04L 9/08* (2006.01)
(Continued)

(52) U.S. Cl.
CPC .......... *H04L 9/0891* (2013.01); *H04L 9/3066* (2013.01); *H04W 12/03* (2021.01); *H04W 12/037* (2021.01); *H04W 12/104* (2021.01);
*H04W 12/106* (2021.01); *H04W 12/73* (2021.01); *H04L 2209/805* (2013.01)

(58) Field of Classification Search
CPC ............ H04L 2209/805; H04L 9/0891; H04L 9/3066; H04W 12/03; H04W 12/037; H04W 12/1004; H04W 12/104; H04W 12/106; H04W 12/73
See application file for complete search history.

(56) References Cited

U.S. PATENT DOCUMENTS 5,146,500 A * 9/1992 Maurer .................. G06F 7/725
380/28
11,199,312 B2 * 12/2021 Hartwig .................. F21V 21/08
(Continued)

FOREIGN PATENT DOCUMENTS

WO 2014190241 A1 11/2014

OTHER PUBLICATIONS

International Search Report based on PCT Application PCT/EP2018/060836 dated Jun. 12, 2018, 14 pages (for reference purpose only).
(Continued)

*Primary Examiner* — Gary S Gracia
(74) *Attorney, Agent, or Firm* — Viering, Jentschura & Partner MBB

(57) ABSTRACT

A method for operating a beacon may include repeatedly emitting an identification number. The identification information is encrypted multiple times in a different manner by a one-way function and is emitted during the repeated emission in a differently encrypted form.

18 Claims, 3 Drawing Sheets

(51) Int. Cl.
  *H04L 9/30* (2006.01)
  *H04W 12/03* (2021.01)
  *H04W 12/037* (2021.01)
  *H04W 12/73* (2021.01)
  *H04W 12/104* (2021.01)
  *H04W 12/106* (2021.01)
  *H04K 1/06* (2006.01)

(56) References Cited

U.S. PATENT DOCUMENTS

| | | | | |
|---|---|---|---|---|
| 2003/0108199 A1* | 6/2003 | Pinder | ............. | H04N 21/23895 380/200 |
| 2004/0093496 A1* | 5/2004 | Colnot | ............. | H04L 9/00 713/168 |
| 2008/0191218 A1* | 8/2008 | Kalem | ............. | H01L 29/51 257/79 |
| 2010/0128873 A1* | 5/2010 | Karroumi | ............. | H04N 21/4405 380/255 |
| 2013/0331038 A1 | 12/2013 | Kusakari | | |
| 2014/0135042 A1* | 5/2014 | Buchheim | ............. | H04W 4/023 455/456.6 |
| 2015/0309151 A1* | 10/2015 | Shibata | ............. | H04W 12/0471 713/150 |
| 2016/0127875 A1 | 5/2016 | Zampini, II | | |
| 2017/0109776 A1 | 4/2017 | Marshak | | |
| 2017/0364699 A1* | 12/2017 | Goldfarb | ............. | G06F 21/6227 |
| 2017/0366353 A1* | 12/2017 | Struttmann | ............. | G06F 21/64 |

OTHER PUBLICATIONS

German Office Action based on Application 10 2017 109 423.7, dated Feb. 16, 2018, 6 pages (for reference purpose only).

Elliptic Curve Cryptography. In: Wikipedia, Die freie Enzyklopädie. (machine translation attached) URL: https://de.wikipedia.org/w/index.php (accessed on Feb. 15, 2018).

Estimote Inc.: Secure beacon advertising with Estimote Secure UUID. URL: https://web.archive.org/web/20161222044852/https://developer.estimote.com/ibeacon/secure-uuid/ (accessed on Feb. 15, 2018).

* cited by examiner

ENCRYPTION OF BEACONS

CROSS-REFERENCE TO RELATED APPLICATIONS

The present application is a national stage entry according to 35 U.S.C. § 371 of PCT application No.: PCT/EP2018/060836 filed on Apr. 27, 2018; which claims priority to German Patent Application Serial No.: 10 2017 109 423.7, which was filed on May 3, 2017; both of which are incorporated herein by reference in their entirety and for all purposes.

TECHNICAL FIELD

The present invention relates to a method for operating a beacon by repeatedly emitting identification information and a beacon with a transmitting device for repeatedly emitting identification information.

BACKGROUND

The so-called "beacon technology" is based on a transceiver system. A "beacon" (in German: "Leuchtfeuer" or also "Bake" or "Peilsender") is a small, mostly battery-operated transmitter, which emits a signal in (definable) time intervals mostly on the Bluetooth Low Energy standard. The radio signal of each beacon is characterized by a unique device identifier (so-called UUID). Beacons can be used to assign a digital identification to objects and locations. Objects (at which a beacon is installed) and locations (at which a beacon is installed e.g. at a wall) can be identified by terminals (e.g. smart devices) in the signal field of the beacon in this manner.

Beacons can be used for identification of a location and for localization, respectively. By placing one or more beacons in a building area, thus, a type of radio-based raster arises, in which a smart device can localize itself via the BLE (Bluetooth Low Energy) interface as well as corresponding algorithms. Therein, the individual identification numbers of the installed beacons give an identifier to a location, by which a smart device can approximately determine the position (basic transmitting area of the beacon can be determined). Algorithms on the smart device can improve the position accuracy e.g. via signal strengths. Therein, it is required that the smart device can access information (e.g. identification number and mapping) in a data storage (e.g. on a Cloud server). If a terminal (for example smart device) comes into the range of a transmitter, it can detect the identification number and for example determine the site via a server query. Therein, the localizing algorithms access the received signal strength of the beacons in the vicinity among other things, as an indicator for the distance to the respective beacon.

SUMMARY

Installing beacons in lighting technology/illumination technology may offer a permanent energy access to supply the beacon with energy. The advantage in turn results from it that the battery of the beacon does not have to be exchanged and thus corresponding life cycle cost and processes can be saved, respectively. Moreover, parameterizations of the beacon can also be adjusted with higher energy consumption without reducing the lifetime of the beacon. Installation processes of beacons and lighting technology can additionally be unified. A further advantage is a defined locking position of a beacon transmitter, which is well protected from manipulation. Thus, a clear and secure identifier can be allocated to a location.

The following enumeration offers an overview over potentials of use of beacons in lighting technology:

Using energy supply of the light installation instead of a battery to reduce the life cycle cost of the beacon;

Using energy supply of the light installation to adapt the transmitting parameters to the service and not to the available residual energy and the parameters of the battery, respectively (for example, frequent transmitting cycles generate high accuracy of the services, but also higher energy consumption);

Exchange of the battery of conventional beacons bears risks (e.g. with regard to errors in the handling);

Avoiding non-availability of the services by uninterrupted energy supply of the beacon;

Installation location below the ceiling is ideal for the signal propagation of the beacon;

Installation location below the ceiling makes the overall system more robust against disturbances/shadings by objects at the level of the floor level in contrast to an installation of the beacon itself at the level of the floor level;

Beacon is protected from manipulation/unauthorized access (unintentional, intentional);

Lighting and services (e.g. localization services) are offered as an overall system "from a single source" (i.e. system supplier is also service provider);

Possibility of using the secure communication network of the light installation, e.g. to configure the beacon or to link beacons with each other;

Unification of the installation processes of beacons and light installation;

Possibility of coupling to further system elements of the peripheral building infrastructure via the communication network of the light installation, e.g. elements of the safety technology;

Optically attractive system since the beacon can be non-visibly accommodated in the light installation.

A beacon can be arranged in or at an electrical illumination device. The beacon communicates with a terminal (e.g. smart device). Therein, the beacon is optionally connected to further beacons or to infrastructure elements via a communication link.

Within an area, human beings and apparatuses optionally have the challenge to orient themselves, to navigate and to locate and use other local digital services (e.g. apps or app functions, Google Maps, Lightify light control). The light installation with integrated beacon in an area becomes a localization and orientation system, respectively, for these potentials of use. Services can now be provided with the self-localization of the terminal realized thereby, such as for instance navigation or the provision of location-specific information.

An aspect of the beacon technology is the possibility of configuring typical parameters like for example signal strength and transmitting interval of the beacon. Different application scenarios can be individually supported by different configurations. If high service quality (accurate localization in short intervals) is requested (e.g. in indoor navigation), very short transmitting intervals are e.g. to be configured.

Currently, batteries are employed for the energy supply of the beacons. By the necessity of exchanging these batteries in regular cycles, high expense as well as correspondingly high life cycle cost arises for the beacons.

High service quality—for example high localization quality, high range, high transmitting interval—requires comparatively much energy at the transmitter module such that the battery of a battery-operated beacon has to be exchanged after short time (e.g. after one month). Besides the disadvantage of the exchange cost, each exchange of a battery additionally bears the risk that the functionality of the localization system is disadvantageously affected by small position change or false handling of the beacons. Optionally, there is the danger that the operator (e.g. owner of a supermarket) is not aware of the lack of energy of the beacons and does not find again the beacons, respectively, if sufficient residual energy is no longer present. However, the services (e.g. navigation) of the beacons should be permanently available to the user. This requires uninterrupted energy supply.

The attachment/installation of the beacons at/in or as a part of a light installation/lamp or an illuminant (briefly summarized in the following: illuminant) would allow using the energy supply of the lighting device for the energy supply of the beacon and thus substituting the battery of the beacon and counteracting the problem formulations associated therewith (compare above) in contrast to a battery-operated beacon.

Basically, there is the specific problem that usual beacon protocols, such as the iBeacon protocol of Apple Inc., use unique radio signals, which are visible for all of the terminals in the environment and unencrypted. Therein, an iBeacon signal is composed of multiple constituents:

UUID: A 16 byte character string, which is for example used for identification of a building (each beacon in the building uses the same UUID in this case).

Major and minor IDs: each a 2 byte character string for major ID and minor ID. Thereby, the beacons can be specified. For example, all of the beacons on a floor use the same major value. By individual minor values, the individual beacons can then be further specified.

Tx: This value indicates the signal strength for a distance of 1 m. It has to be calibrated in advance.

Services, which are offered in a service area based on the beacons use these signals to e.g. identify specific locations and thus to provide contextual data. Thus, multiple beacons can for example be distributed in a warehouse. A warehouse-owned app is installed on the smart phone of a buyer. It then registers for example a specific signal of a beacon B1 in the vicinity of specific goods. The smart phone now downloads a corresponding good description and advertising, respectively, from a server initiated by the received beacon signal of the beacon B1 and presents it to the buyer on his smart phone. Thereby, the buyer or user obtains location-specific information.

Since beacon signals are unencrypted and are transmitted visible for each terminal, beacons are exposed to various attack vectors. On the one hand, so-called "piggybacking" is known. Therein, the public signal of the beacon can be used by third parties to offer corresponding services in the service area. For example, providers could offer discounts to customers in the shop of the competitor via an own application to encourage them to buy the own products. Thus, a competitor app can for example register the specific signal of the beacon B1 from the above example and thereby ascertain that the smart phone resides in the area of the beacon. Thereby, the customer with the smart phone can e.g. be directed to the shop nearby. Hereby, economic damage can preliminarily arise for the shop, which has installed the beacons.

A further possibility of attack exists by so-called "spoofing". Therein, the UUID including major and minor of a beacon is known to an attacker. Thus, he can also employ the signal himself at another location. E.g., this could be used to spoof terminals that they are at another location and e.g. to initiate automatic payment processes at other locations than originally intended. This possibly annoys the customers, which results in disadvantages for the business owner. This can also present high risk for certain applications.

The described problem applies to all beacon protocols, which use a publicly visible identification to allow location-related and contextual services, respectively (e.g. also the Eddystone protocol of Google). In order to be able to at least slightly avoid this problem, cyclical change of the UUIDs was for example effected. However, this can possibly be very expensively to be coordinated with the terminals.

Thus, the is in inhibiting (joint) use or replication of the beacon information by unauthorized third parties as far as possible.

A method for operating a beacon by repeatedly emitting identification information is accordingly provided. Thus, the beacon itself typically emits own identification information again and again, such as in periodic manner, e.g. by radio, in order that terminals can register and use this information. Now, in order to prevent misuse of this identification information, the identification information is differently encrypted multiple times by a one-way function and emitted correspondingly differently encrypted in the repeated emission. This means that the identification information can be again and again newly encrypted and therein a new encryption result usually results although the identification information to be encrypted is always the same. However, it is not required that the identification information is newly encrypted before each emission. For example, new encryption can be effected in each fifth emission or after each ten minutes.

A one-way function is a mathematical function, which can be easily calculated with respect to its complexity, but is difficultly invertible. In practice, inversion is virtually not feasible in reasonable time. In this manner, it can be virtually prevented that the identification information of the beacon is ascertained from the encrypted data.

In a non-limiting embodiment, the one-way function is a trapdoor function and an elliptical curve. With such a trapdoor function (also called trapdoor one-way function), an efficient inversion is only possible if certain additional information is provided. For example, if an elliptical function is used, it should be recorded in the beacon as well as in the corresponding mating location.

Furthermore, the identification information emitted by the beacon can be periodically newly encrypted. This means that the identification information is not static, but is subjected to dynamic change. Therein, it is newly encrypted with the one-way function in certain, fixed time intervals, i.e. different output values arise with identical input values. In this manner, fixed, encrypted identification information can be prevented from being used as location information.

In a specific embodiment of the method, the information contains a unique device identifier and a UUID. Thereby, even the main identification information is encrypted such that more coarse location information either cannot be extracted from the encrypted identification information.

In a non-limiting embodiment, the encrypted identification information contains parts in a preset or standardized beacon identifier format and a major value and a minor value. Optionally, the entire encrypted identification information is present in the preset or standardized beacon identifier format. Hereby, it can for example be ensured that in a larger building, in which a plurality of beacons is installed, an individual beacon cannot be identified solely due to its emitted information. Therein, e.g. a 2 byte character string is understood by a major value as well as also by a minor value. According to protocol, however, other character strings can also be understood thereby.

In a special configuration, the one-way function represents a graphic function and an elliptical curve, and in encrypting with this one-way function, two coordinates of a point on the elliptical curve are calculated as the identification information corresponding to the identity of the beacon. Thus, at least one point on the elliptical curve is calculated from the entire identification information or a part thereof. For example, a coordinate pair with an X value and a Y value can be calculated from a major-minor value pair on a preset elliptical curve. These two coordinates X and Y can then be emitted by the beacon as encrypted identification information.

In a non-limiting application of the above described method for operating a beacon, automatic initiation of at least one function is effected in a receiving apparatus and/or an information processing unit connected thereto by emitting encrypted identification information according to the above described method. Subsequently, (wireless) reception as well as examination of the encrypted identification information is effected in the receiving apparatus (according to one or more preset rules) based on the one-way function without decrypting the encrypted identification information. Thus, one or more functions can be initiated with the received values as function input on the receiving apparatus and/or on the information processing unit connected thereto. For example, the function in the receiving apparatus can be an app in a smart phone. This app is automatically initiated in that a beacon emits the encrypted identification information and the smart phone receives this encrypted information and for example examines if the encrypted information matches the one-way function also recorded on the smart phone. Thus, an advertising app can for example be initiated if a smart phone is located in the vicinity of a transmitting beacon, which the smart phone identifies.

For examining the received encrypted identification information, the receiving apparatus can resort to internally recorded data and/or to data recorded on an external server. Thus, the parameters of an elliptical curve can for example be recorded in the terminal (e.g. smart phone). Thereby, the terminal is by itself capable of examining the received identification information and ascertaining correspondence with the one-way function. Alternatively or additionally, it can be provided that the additional information required for examining the identification information is recorded in an external server, i.e. outside of the receiving apparatus. In this case, the receiving apparatus or terminal has to establish a communication link with the external server upon receiving the encrypted identification information to retrieve the required additional information there. This would have the advantage that this additional information (e.g. the parameters of the elliptical curve) can be centrally changed for all of the terminals without having to perform a corresponding update of the terminals. Then, the decryption information either does not have to be permanently kept available on the terminal.

In a non-limiting embodiment, third information relating to the identity of the beacon is only output by the receiving apparatus and/or the information processing unit connected thereto if a correspondence between the encrypted identification information and the one-way function is ascertained in the examination. Thus, a part of the unencrypted identification information and the actual, unencrypted major value and minor value, which uniquely characterize the beacon, is for example only provided if the encrypted identification value is located on the elliptical curve.

The above mentioned object is also solved by a beacon with a transmitting device for repeatedly emitting identification information and an encryption device, by which the identification information can be differently encrypted multiple times by a one-way function and can be emitted correspondingly differently encrypted in the repeated emission. In a non-limiting embodiment, the encrypted identification information can be transmitted in a standardized beacon identifier format, with unique device identifier (UUID), major value and minor value, by the transmitting device.

The possibilities of variation and advantages mentioned above in context of the described method analogously also apply to the beacon. Therein, the respective method features are to be regarded as functional features of corresponding means of the beacon.

Further, a lighting device with a housing, an illuminant arranged in the housing and a just mentioned beacon arranged in or at the housing is also proposed. The lighting device including beacon has the advantage that it also provides the beacon functionality besides the lighting functionality. Since rooms are usually comprehensively equipped with lamps, there is the advantage that beacon signals are also comprehensively available with the beacons of the lighting devices. The current supply of the lighting device can also be used for the illuminant as well as the beacon at the same time.

Further, a communication system with such a beacon and at least one receiving apparatus for wirelessly receiving and for examining the encrypted identification information from the at least one beacon is provided. Thus, the system not only includes the primarily transmitting beacon, but also the corresponding receiving apparatus. The receiving apparatus is a mobile terminal such as for instance a smart phone. The beacon and the mobile terminal can thus communicate with each other via a radio link. Alternatively, the beacon itself can also be mobile and e.g. be installed in a vehicle such as for instance a bus. Receiving apparatuses correspondingly installed in an environment of the vehicle can then identify and localize, respectively, the beacon based on the identification information after the examination.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the illumination apparatus. In the following description, various aspects are described with reference to the following drawings, in which.

DETAILED DESCRIPTION

The embodiments described in more detail below present non-limiting embodiments. Therein, it is to be noted that the individual features cannot only be realized in the described feature combinations, but also alone or in other technically reasonable feature combinations.

A non-limiting construction of a lighting device with beacon (below mostly referred to as beacon) is first explained in context of FIG. 1.

Figure 1:
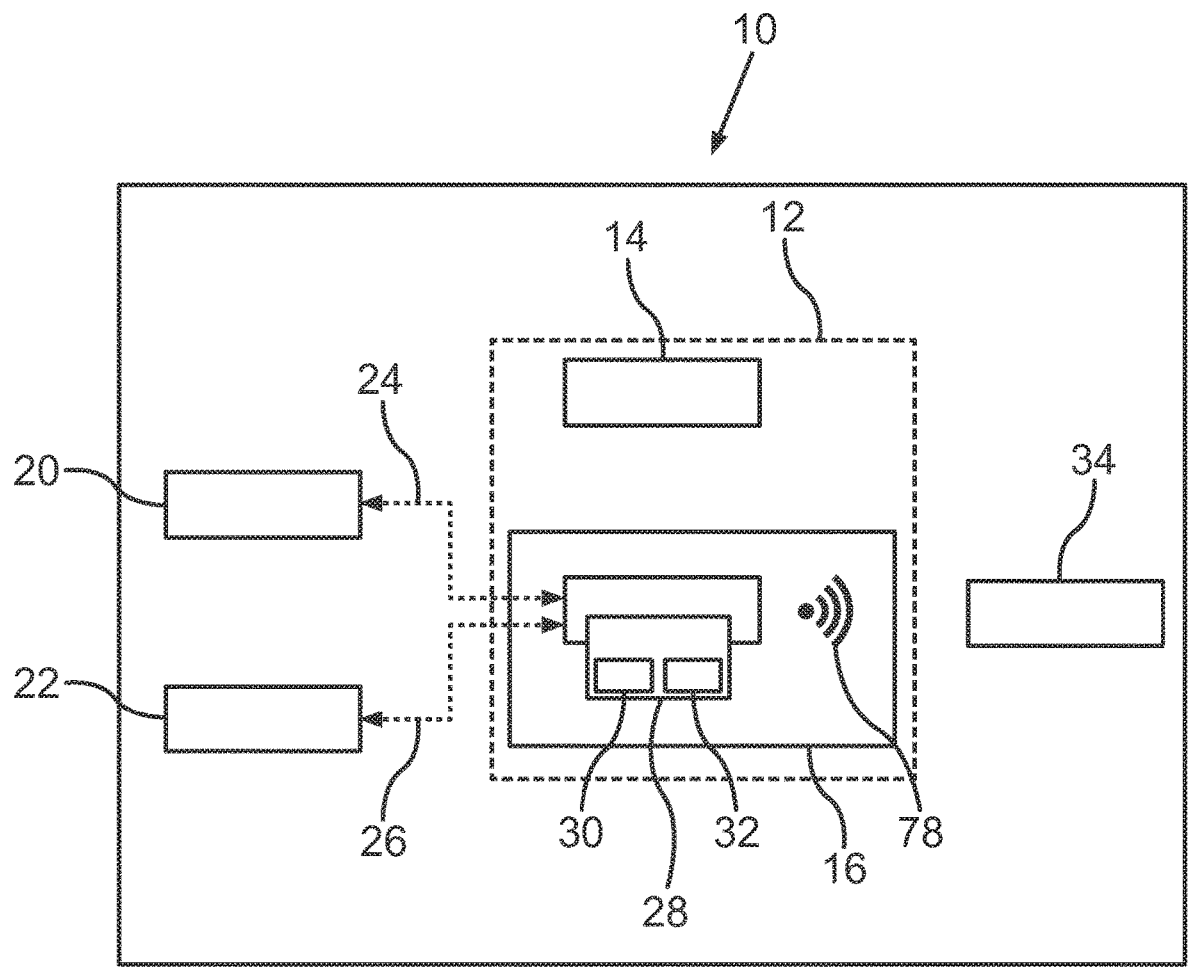
FIG. 1 a schematic block representation of an integration of a beacon as a transmitting device in a lighting device.

FIG. 1 shows a lighting system 10 in a schematic block representation, which includes an illumination device 12 (below also lighting apparatus) as well as a plurality of further illumination devices 20. Each of the illumination devices 12, 20 includes a lighting device 14 with one or also more illuminants not further illustrated for emitting light as well as a beacon 16 as a transmitting device. Presently, the beacon 16 is arranged in the lighting device 14 (below also illuminant). The beacon 16 unidirectionally wirelessly emits a radio signal 78 with identification data specific to the beacon 16 in the manner of broadcast. Presently, the emission is effected using near field radio based on a Bluetooth Low Energy (BLE) protocol.

The beacon 16 includes a control unit 28, which includes a computer unit 30 as well as a storage unit 32 communicatively coupled to the computer unit 30. An executable computer program for the computer unit 30 is stored in the storage unit 32, such that a preset functionality can be provided by the computer unit 30. Presently, the functionality serves for operating the beacon 16 in presettable manner. The further illumination devices 20 are basically constructed comparable to the illumination device 12.

Presently, the beacon 16 is formed as a transmitting-receiving device, which can also provide a bidirectional communication link 24 besides the emission of the radio signal 78. The illumination device 12 and the beacon 16 is in communication link with the further illumination devices 20, which are correspondingly formed, via the communication link 24.

Presently, the communication link 24 is a bidirectional communication link, which is also based on near field radio and uses the above mentioned BLE standard.

Moreover, the illumination device 12 and the beacon 16 is in communication link with an infrastructure device 22 via a further communication link 26, via which data relating to an intended operation of the illumination device 12 as well as also data with respect to the further illumination devices 20 can be exchanged. The illumination device 12, and the beacon 16 thereof, accordingly also serves as a device for forwarding corresponding data from the infrastructure device 22 to the illumination devices 20 and vice versa at the same time, for example in the manner of a network node.

The radio signal 78 emitted by the beacon 16 and the beacons of the illumination devices 20, respectively, can be received and evaluated by one or also multiple communication terminals 34 (receiving apparatuses). Presently, the communication terminal 34 is a mobile radio terminal in the manner of a smart phone. In the present configuration, it is only provided that the communication terminals 34 receive and evaluate the radio signal 78. Therefore, communication is only unidirectionally effected. Non-illustrated beacons of the further illumination devices 20 can also be received by the communication terminal 34. Thereby, a series of services can be provided or allowed by means of the communication terminal 34, which allows a user of the communication terminal 34 to use very different additional services.

Within a preset area, in which the illumination devices 12, 20 are arranged and in which the radio signal 78 can be received by the communication terminal 34, the user of the communication terminal 34 can thereby better orient himself and navigate, respectively, as well as also locate and use other local, such as digital, services, such as for example apps, app functions, Google Maps, Lightify, light control and/or the like. The lighting system 10 with the beacons 16 arranged in the respective illumination devices 12, 20 allows a localization and orientation system, respectively, for the above mentioned potentials of use. In a non-limiting embodiment, it is possible to provide an accurate self-localization of the communication terminal 34, whereby services become usable, such as for instance the navigation or the provision of location-specific information.

An aspect of the beacon technology is the possibility of configuring typical parameters, such as for example a signal strength and/or a transmitting interval of the radio signal 78 of the beacon 16. Different application scenarios can be individually supported by different configurations. For example, if high service quality, for example accurate localization in short intervals, is desired, as it is required in indoor navigation, very short transmitting intervals can be configured.

With respect to the problem of inhibiting unauthorized use of published beacon information by third parties, simple encryption methods for obscuring the IDs could be contemplated. Such encryption methods could be based on reversible mathematical methods (shift, XOR, addition, etc.). These methods do not withstand a stochastic analysis (e.g. eavesdropping over a longer period of time) and thus the signals can nevertheless be jointly used and copied, respectively. Furthermore, it is problematic in the mentioned encryption methods that all of the possibilities of the pre-calculated (pseudo) random IDs have to be kept available on the corresponding mating location (mobile phone, backend, etc.). In addition, the above mentioned approaches are possibly subject to a temporal synchronization, whereby the complexity of the overall system increases.

Besides avoiding unauthorized use of the beacon identification information, it is additionally to be sought that the type and the number of the employable terminals is not reduced by encryption, thus compatibility with existing standards (e.g. iBeacon) is ensured. If the beacon signals are further used for the localization of mobile entities (e.g. persons or objects), the application is also subject to the described problem. Therein, the position of objects is only to be accessible to authorized systems.

Therefore, an encryption method for beacons or transmitting-receiving devices is proposed, which uses e.g. periodically newly calculated identification information or identification values by the employment of a one-way function (such as a trapdoor function, e.g. an elliptical curve) to protect the beacon from misuse. Therein, the encryption method does not change the transfer protocol (e.g. iBeacon) and thus is usable with all terminals.

In a specific embodiment, the transfer of the beacon is effected according to the iBeacon protocol. Herein, a fixed major and minor ID are assigned to the beacon, which are recorded in the storage of the beacon and in corresponding mating locations (e.g. in an application and database on an application server, respectively) and a receiving apparatus, respectively. Together with the UUID, these major and minor values exemplarily represent the actual identification, i.e. the identification information, of a beacon. However, these major and minor IDs are not transmitted by the beacon. Instead, the beacon periodically forms a random value k (e.g. integer in the range of 0 to $2^{16}$) and calculates a point P by means of point multiplication on the curve (P=k×G) on an elliptical curve (e.g. $y^2=a\times x^3+b\times x+c$ with a=major ID, b=minor ID and c=agreed prime number) starting from a basic point (G with constant x in compressed form and y value resulting from it on the curve). In a non-limiting embodiment, the UUID is not encrypted by the elliptical curve, since the receiving apparatus has to be able to respond to the beacon.

The equation of the elliptical curve should be recorded both in the beacon and in the corresponding mating locations or receiving apparatuses. The server and the terminal, respectively, thus have data, which is additionally required for calculating the curve. Third parties do not have exactly this data such that misuse thereof can be prevented.

The coordinates (x and y value) of a calculated point on the elliptical curve form the major and minor IDs to be publicly emitted, which beneficially periodically change. Thus, an iBeacon-compliant signal consisting of UUID as well as major and minor IDs is emitted.

Due to the Galois field (mathematical, finite field with range of numbers across N=e.g. greatest possible prime number in $2^{16}$) of the elliptical curve, both recalculation and stochastic analysis and side channel attacks, respectively, are therein excluded according to the current state of the scientific knowledge. The mating location, which is to use the signal, does not have to keep available all of the possible IDs as set forth in the above description of problem, but only examine if the received point is located on the corresponding curve for each known major-minor pair. Thus, actual decryption of the major and minor values is not effected. Rather, a specifically parameterized one-way function or curve is present for each beacon and it only has to be examined if the coordinates (identification information) again and again changing over the time are located on the corresponding curve.

A concretization could be in that the values a, b and c are known to a mating location or the receiving apparatus each for one or more elliptical curves $y^2 = a x x^3 + b x x + c$. The number of the known curves corresponds to the number of beacons, which are installed in a service area for implementing a service. With the received x and y values, it can now be examined if one of the known equations is satisfied and a beacon is uniquely identified via it.

The computing effort on the receiver side is both constant and linearly scalable with the number of the beacons installed in the system, respectively. The computing effort in the beacon restricts itself to a point multiplication on the elliptical curve within a preset time interval (can also be random). Since each point on the individual curve is valid, this method is not dependent on a (temporal) synchronization.

Thus, the encryption method can have further specific characteristics. In a non-limiting embodiment, lists with possible (pseudo) random IDs do not have to be kept available for examining the received IDs and for conclusion about beacons for the implementation of specific services, but it only has to be examined if for a received major-minor pair, the corresponding point is on one of the elliptical curves. Thus, the computing effort is constant and linearly increases with the number of installed beacons, respectively. E.g. if 15 beacons are present in a service area, maximally 15 calculations have to be performed.

Therein, the encryption method can be employed for beacons and transmitting-receiving devices of different formation, respectively. According to a first variant, the beacon can be a transmitting-receiving device in/at or as a part of a light installation/a lamp or an illuminant. According to a second variation, the transmitting-receiving device can be formed outside of the light installation/lamp or the illuminant in battery-operated manner. Corresponding to a third variant, the transmitting-receiving device can be formed outside of the light installation/lamp or the illuminant with an energy supply via a fixed current source. Further variants are also conceivable.

The method can also be employed if mobile beacons (e.g. in/on vehicles) are to be localized by a network of fixedly installed beacons. Possibilities e.g. for securely tracking objects, the position of which cannot be jointly tracked by third parties due to the encryption system, result from it.

In a further formation of the method, the UUID can also be encrypted by the method besides major and minor ID. In this variant, the major and minor IDs are used for secure key exchange between beacon and mating location. Hereby, the major-minor approach would be used for symmetric encryption.

Figure 2:
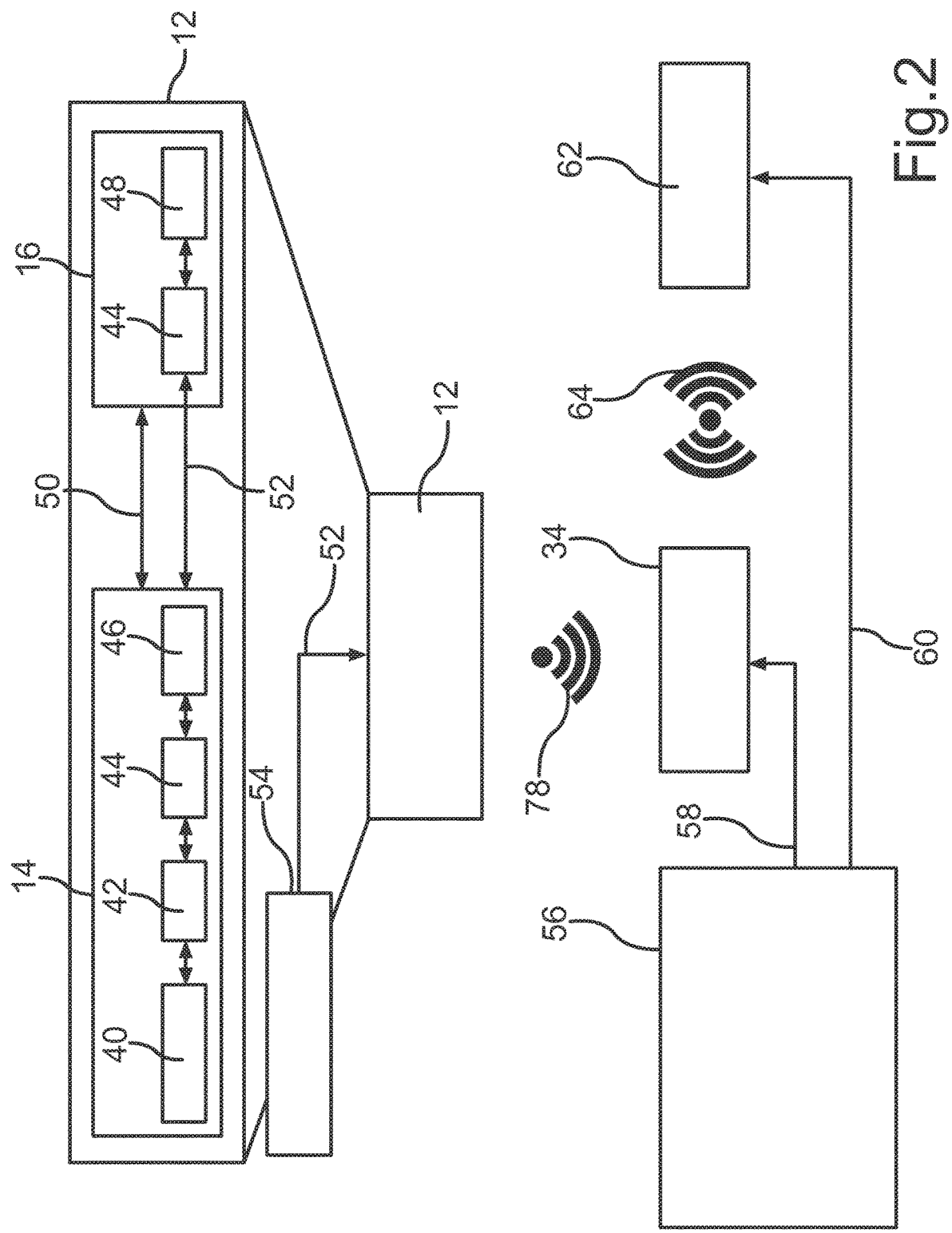
FIG. 2 a schematic block representation of a first configuration for a lighting device.

A specific embodiment is illustrated in FIG. 2 in a block diagram. Principally, the structure of the lighting system of FIG. 2 is based on the structure of FIG. 1. An illumination device 12 includes a lighting device 14 and a beacon 16. The lighting device 14 may include a lighting installation, a lamp or an illuminant. In a non-limiting embodiment, it may include a control unit 40 for corresponding information processing, an electronic ballast 42, an energy interface 44 and a LED circuit board 46. Between these components 40 to 46, there is for example each one energy transfer channel and/or data channel. The beacon 16 (in the present document also referred to as beacon or transmitting (receiving) device) also includes an energy interface 44 as well as an information processing unit 48. Both are in communication via an energy transfer channel.

The lighting device 14 is in physical connection 50 to the beacon 16. This means that the two components 14 and 16 can be arranged in or at each other and be integrated in each other, respectively. An energy or mains supply unit 54 provides a 230 V AC voltage to the illumination device 12 for example via an energy transfer channel 52.

Repeated (periodic) calculation of fictive, i.e. encrypted, major and minor IDs based on points for example on a defined elliptical curve is effected in the illumination device 12. The curve itself is calculated from the actual or "real" major and minor IDs. Thus, a beacon or radio signal 78 of the illumination device 12 for example includes a UUID and encrypted identification information. It can include a fictive or encrypted major value (major ID) as well as a fictive or encrypted minor value (minor ID) with the aid of a one-way function (e.g. elliptical curve). The one-way function is based on the actual major and minor IDs and is parameterized with them.

A communication terminal 34 as a receiving apparatus receives and examines the completely or partially encrypted identification information. Therein, decryption of the encrypted parts of the identification information does not have to occur. Rather, the communication terminal 34 only has to examine if the received encrypted components correspond to the one-way function used for encryption (e.g. if the received point coordinates are located on a certain elliptical curve). Thereto, the communication terminal 34 requires further information about the one-way function.

Such further information with respect to the one-way function can be recorded in a storage unit 56. It can be integrated in the communication terminal 34 according to a first variant 58 or be part of a central data processing 62 (e.g. service server) according to a second variant 60. In the latter case, there is a communication link 64 between the communication terminal 34 and the central data processing 62.

For example, the "real" major and minor IDs are recorded in the storage unit 56. The elliptical curve is for example parameterized with them and it is then examined in the communication terminal 34 if the received coordinates (encrypted major and minor IDs) are located on the elliptical curve.

In a variant of the concept presented in FIG. 2, the beacon 16 is not part of an illumination device 12. Rather, the beacon 16 is standing alone and thus executes the method.

Figure 3:
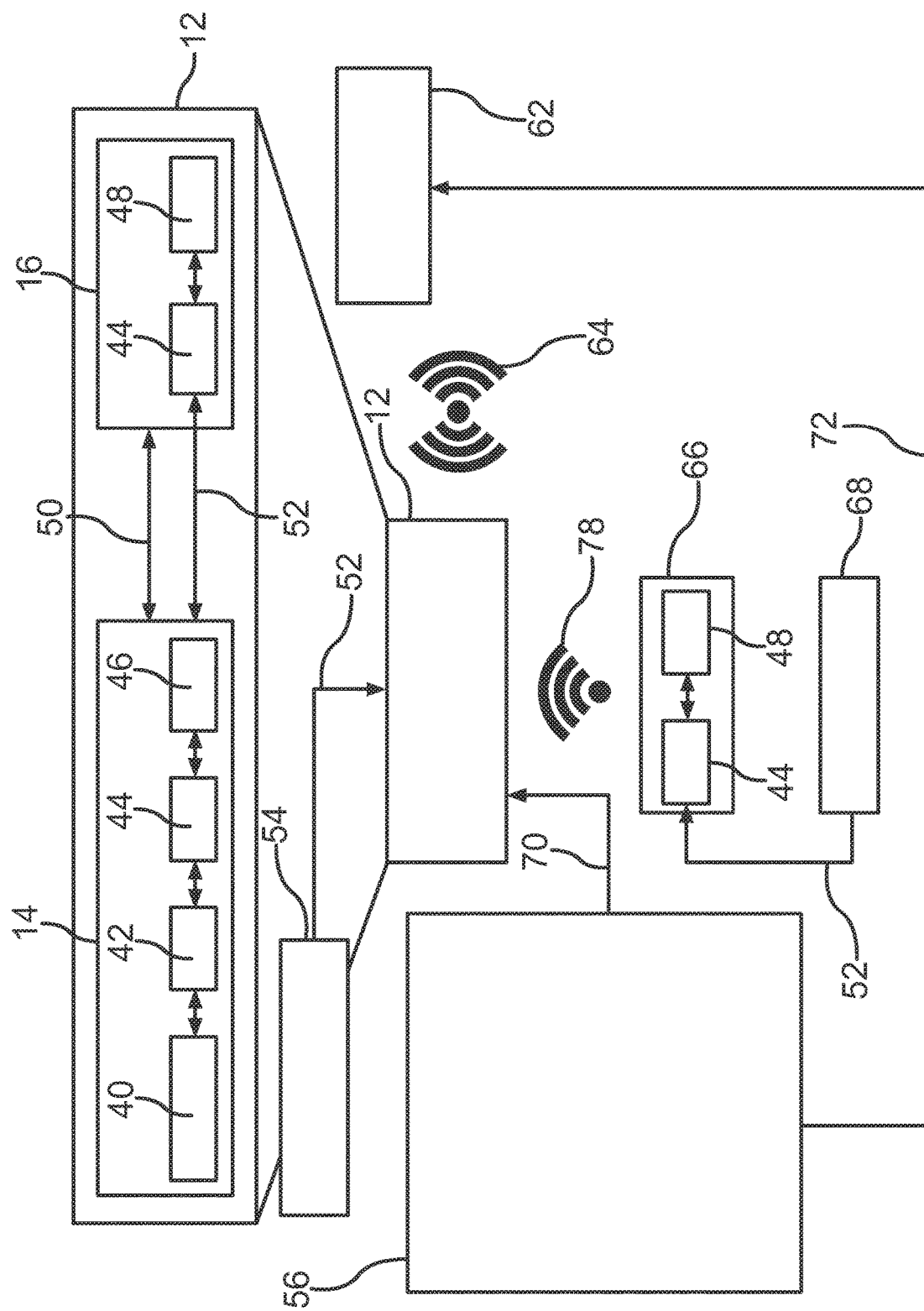
FIG. 3 a schematic block representation of a second configuration for a lighting device.

In a further embodiment according to FIG. 3, the lighting device 12 including beacon 16 is substantially configured as in the example of FIG. 2. Thus, reference is made to the above description hereto. In the example of FIG. 3, however, the lighting device 12 and its beacon 16, respectively, now do not serve as a transmitter, but as a receiver of the encrypted identification information. Thereto, the beacon 16 of the lighting device 12 has a corresponding receiving functionality. A further mobile beacon 66 serves as a transmitter and optionally also has receiving functionality. For example, it also includes an energy interface 44 and an information processing unit 48 like the beacon 16, which are in communication with each other via an energy transfer channel. An energy supply unit 68, which can for example be a battery, supplies the further beacon 66 via an energy transfer channel 52.

The (mobile) beacon 66 transmits the completely or partially encrypted identification information by means of a radio signal 78 to the lighting device 12 and the beacon 16 thereof, respectively, with receiving functionality as in the example of FIG. 2. Therein, repeated or periodic calculation of fictive major and minor IDs is effected in the (mobile) beacon 66 based on points on for example a defined elliptical curve, which is there calculated from the "real" major and minor IDs.

The "real" major and minor IDs are known to the receiving lighting device 12. Thus, they are for example recorded in a storage unit 56 of the beacon 16 or the lighting device 14 according to a first variant 70. According to a second variant 72, the storage unit 56 can in turn be part of a central data processing 62. In the latter case, a wired or wireless communication link 64 has to exist between the lighting device 12 and the central data processing 62.

With this structure according to the embodiment of FIG. 3, secure tracking of mobile beacons is possible.

LIST OF REFERENCE CHARACTERS

10 Lighting system
12 illumination device
14 lighting device
16 beacon
20 illumination device
22 infrastructure device
24 communication link
26 communication link
28 control unit
30 computer unit
32 storage unit
34 communication terminal
40 control unit
42 ballast
44 energy interface
46 LED circuit board
48 information processing unit
50 connection
52 energy transfer channel
54 mains supply unit
56 storage unit
58 variant
60 variant
62 data processing
64 communication link
66 beacon
68 energy supply unit
70 variant
72 variant
78 radio signal

The invention claimed is:

1. A method for operating a beacon comprising:
repeatedly emitting identification information,
wherein:
the identification information is differently encrypted multiple times by a one-way function and emitted correspondingly differently encrypted in the repeated emission;
the one-way function is a trapdoor function and an elliptical curve and two coordinates of a point on the elliptical curve are calculated as the identification information corresponding to the identity of the beacon in the encryption;
each elliptical curve has values a, b and c defined as $y^2 = a \times x^3 + b \times x + c$ where each elliptical curve is known to a mating location or a receiving apparatus; and
a plurality of known elliptical curves corresponds to a number of beacons installed in a service area for implementing a service.

2. The method according to claim 1, wherein the identification information is periodically newly encrypted.

3. The method according to claim 1, wherein the identification information comprises a unique device identifier.

4. The method according to claim 1, wherein the encrypted identification information comprises parts in a preset beacon identifier format.

5. The method according to claim 1, wherein the parts in the preset beacon identifier format represent a major value and a minor value.

6. A method for automatically initiating at least one function in a receiving apparatus and/or an information processing unit connected thereto;
wherein the method comprises:
performing the method according to claim 1; and
receiving and examining the encrypted identification information in the receiving apparatus based on the one-way function without decrypting the encrypted identification information.

7. The method according to claim 6, wherein the receiving apparatus and/or the information processing unit connected thereto resorts to internally recorded data and/or to data recorded on an external server for the examining of the encrypted identification information in the receiving apparatus.

8. The method according to claim 6, wherein the encrypted identification information is tested in the examination when the encrypted identification information characterizes at least one point of the one-way function.

9. The method according to claim 6, wherein a third information relating to the identity of the beacon is only output by the receiving apparatus and/or the information processing unit connected thereto when a correspondence between the encrypted identification information and the one-way function is ascertained in the examining of the encrypted identification information in the receiving apparatus.

10. The method according to claim 9, wherein the third information corresponds to at least a part of the unencrypted identification information.

11. The method according to claim 6, wherein the one-way function is an elliptical curve, the encrypted identification information comprises coordinates and the encrypted identification information is ascertained in the examination when the coordinates are located on the elliptical curve.

12. A beacon comprising:
a transmitting device for repeatedly emitting identification information; and
an encryption device, by which the identification information can be differently encrypted multiple times by a one-way function and can be emitted correspondingly differently encrypted in the repeated emission;
wherein:
the one-way function is a trapdoor function and an elliptical curve and two coordinates of a point on the elliptical curve are calculated as the identification information corresponding to the identity of the beacon in the encryption;
each elliptical curve has values a, b and c defined as $y^2 = a \times x^3 + b \times x + c$ where each elliptical curve is known to a mating location or a receiving apparatus; and
a plurality of known elliptical curves corresponds to a number of beacons installed in a service area for implementing a service.

13. The beacon according to claim 12, wherein the encrypted identification information can be transmitted in a standardized beacon identifier format from the transmitting device.

14. An electronic device comprising:
a housing;
an energy supply device arranged in the housing; and
a beacon according to claim 12, which is arranged in or at the housing.

15. A lighting device comprising:
a housing;
an illuminant arranged in the housing; and
a beacon according to claim 12, which is arranged in or at the housing.

16. A communication system comprising:
at least one beacon according to claim 12; and
at least one receiving apparatus configured to wirelessly receive and configured to examine the encrypted identification information in the receiving apparatus based on the one-way function without decrypting the encrypted identification information from the at least one beacon.

17. The communication system according to claim 16, wherein the beacon and/or the receiving apparatus are formed mobile to each other.

18. A method for providing encrypted identification information by a beacon, wherein the method comprises:
providing the identification information;
encrypting the identification information multiple times with different encryption results by a one-way function; and
emitting the encryption results successively;
wherein:
the one-way function is a trapdoor function and an elliptical curve and two coordinates of a point on the elliptical curve are calculated as the identification information corresponding to the identity of the beacon in the encryption;
each elliptical curve has values a, b and c defined as $y^2 = a \times x^3 + b \times x + c$ where each elliptical curve is known to a mating location or a receiving apparatus; and
a plurality of known elliptical curves corresponds to a number of beacons installed in a service area for implementing a service.

* * * * *